(12) United States Patent
Olde-Heuvel et al.

(10) Patent No.: US 6,293,573 B1
(45) Date of Patent: Sep. 25, 2001

(54) SLIDING CONNECTION

(75) Inventors: Bernardus Johannes Maria Olde-Heuvel, Haaksbergen; Petrus Antonius Besselink, Enschede, both of (NL)

(73) Assignee: Otto Bock Orthopaedische Industrie Besitz-und Verwaltungs-Kommanditgesellschaft, Duderstadt (DE)

( * ) Notice: Subject to any disclaimer, the term of this patent is extended or adjusted under 35 U.S.C. 154(b) by 0 days.

(21) Appl. No.: 09/446,737
(22) PCT Filed: Jun. 23, 1998
(86) PCT No.: PCT/EP98/03829
   § 371 Date: Dec. 23, 1999
   § 102(e) Date: Dec. 23, 1999
(87) PCT Pub. No.: WO98/59183
   PCT Pub. Date: Dec. 30, 1998

(30) Foreign Application Priority Data

Jun. 24, 1997 (NL) .................................................. 1006380

(51) Int. Cl.⁷ .................................................. B60G 11/54
(52) U.S. Cl. .................................. 280/124.165; 280/779; 280/124.179
(58) Field of Search ............................. 280/779, 124.127, 280/124.131, 124.14, 124.1, 124.179, 124.165; 267/196, 134, 135, 198, 207, 209

(56) References Cited

U.S. PATENT DOCUMENTS 3,674,283 * 7/1972 Jellison et al. ................. 280/124.102
5,099,959    3/1992 Sciard ................................. 188/65.1
5,749,596 * 5/1998 Jenson et al. ................. 280/124.166

FOREIGN PATENT DOCUMENTS

86/05566   9/1986 (WO).
91/02179   2/1991 (WO).
93/07404   4/1993 (WO).

* cited by examiner

Primary Examiner—Paul N. Dickson
Assistant Examiner—Faye M. Fleming
(74) Attorney, Agent, or Firm—Foley & Lardner

(57) ABSTRACT

The invention relates to a linear sliding connection (1; 14; 18; 21; 29; 33) between two structural parts (2, 3, 9, 10; 3, 38, 39, 40, 2, 3, 10, 25). Said structural parts can slide back and forth in relation to each other with a damping effect in at least one of the two directions of movement. The invention is characterised by a mechanical friction damping element with a wire basket (4) which acts as a friction or clamping element. Said wire basket (4) encompasses the first (2, 3; 3, 38) of the two moveable structural parts concentrically on a longitudinal section in such a way that it rests on the outer surface of said first structural part, with one axial end (first basket end 4a) fixed on the second structural part (9, 10; 39, 40; 25, 10) and the other axial end (second basket end 4b) positioned on said second structural part in such a way that it is axially slideable in a longitudinal direction. An elastic tension element (13; 41) acts upon said second basket end (4b) in an axial direction in such a way that the axial length of the wire basket (4) is stretched to a certain extent. At the same time, it presses essentially radially against the outer surface of the first structural part (2, 3; 3, 38) which it encompasses.

18 Claims, 6 Drawing Sheets

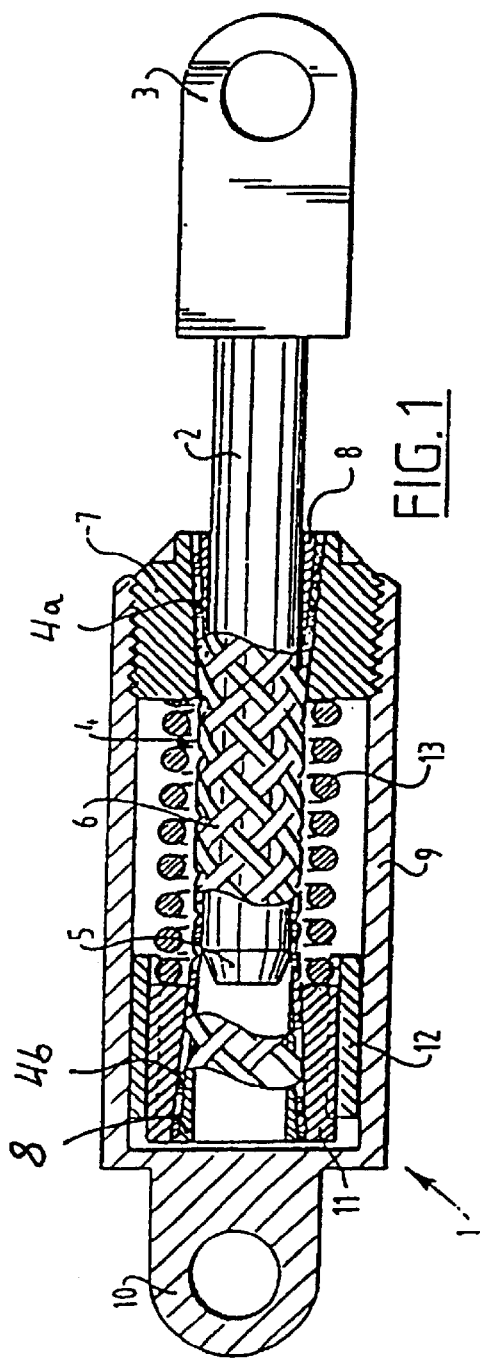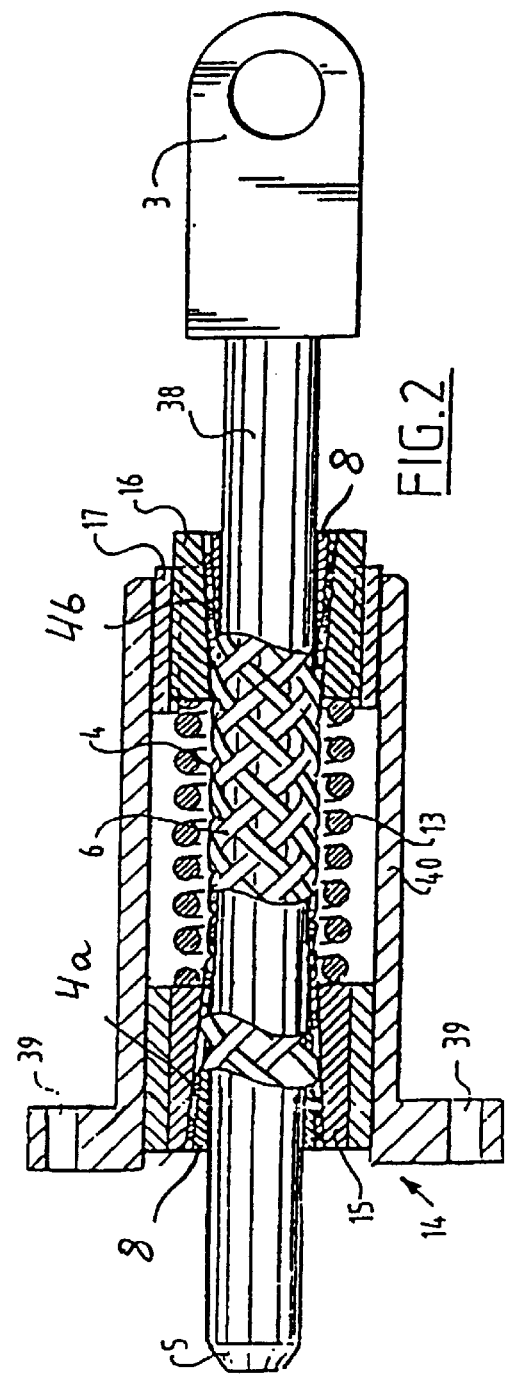

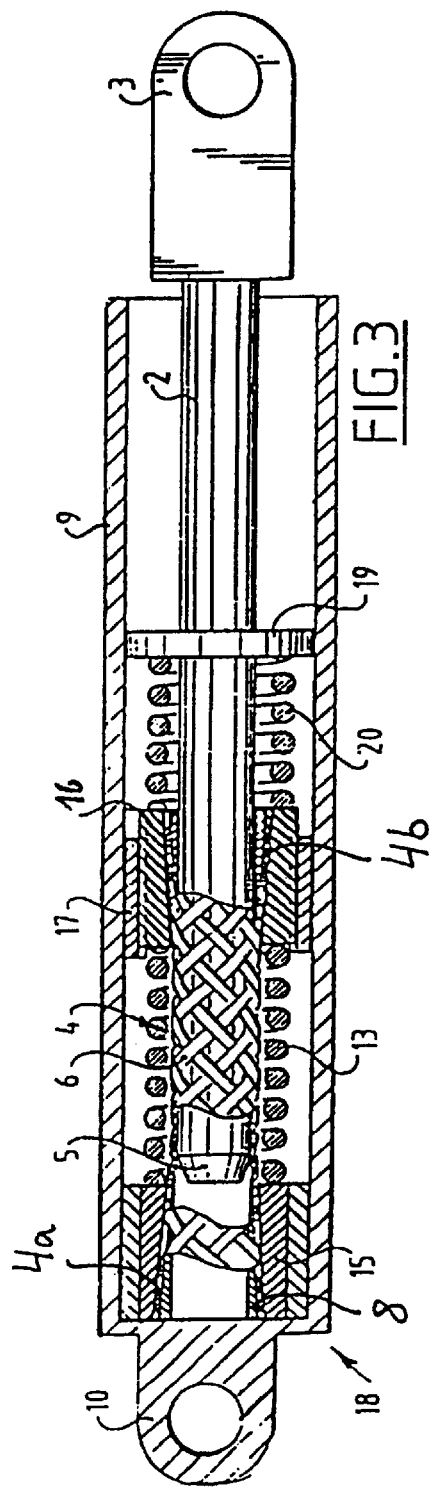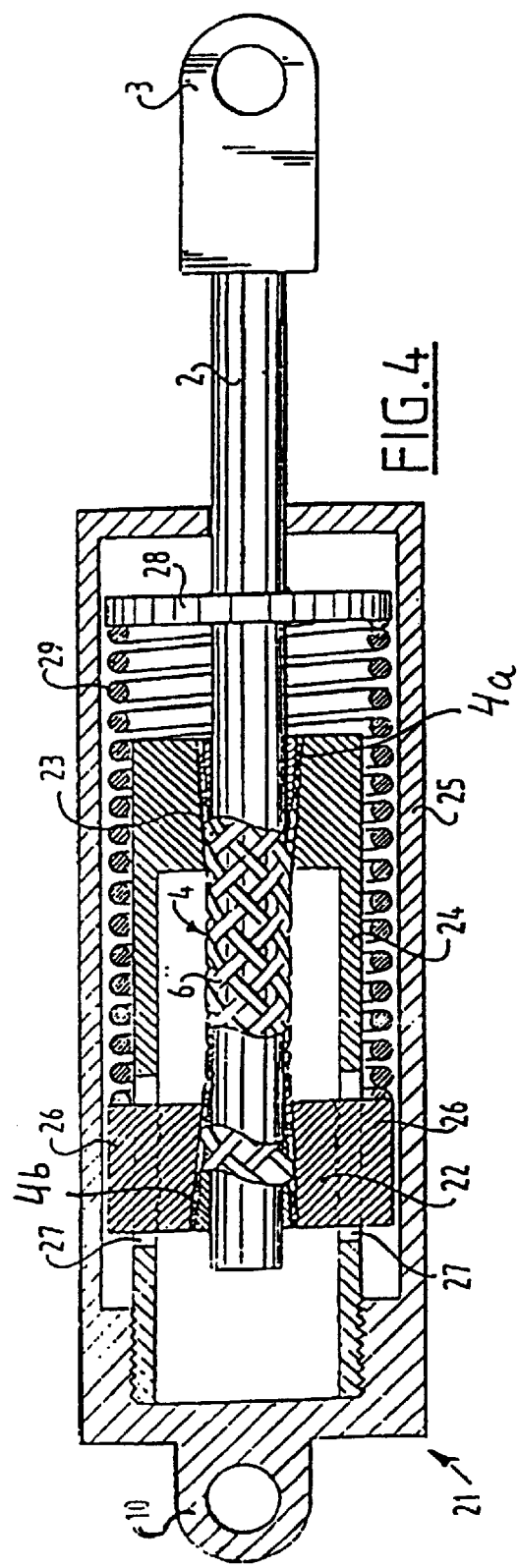

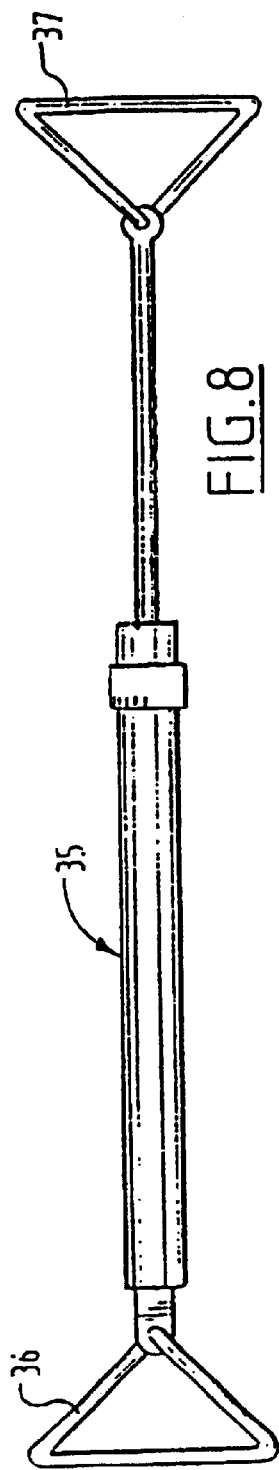
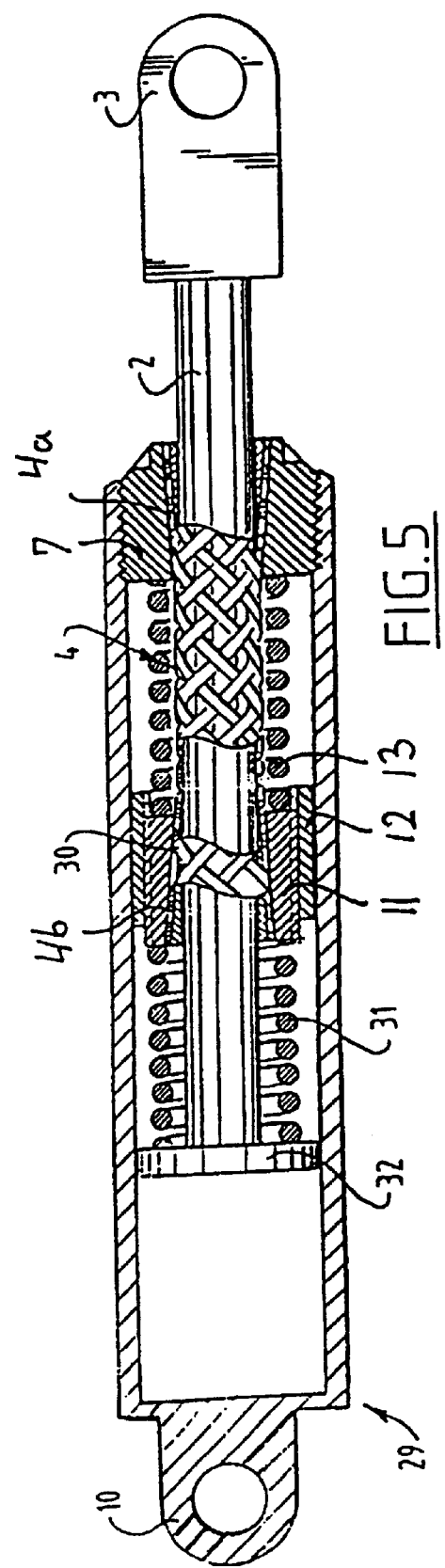

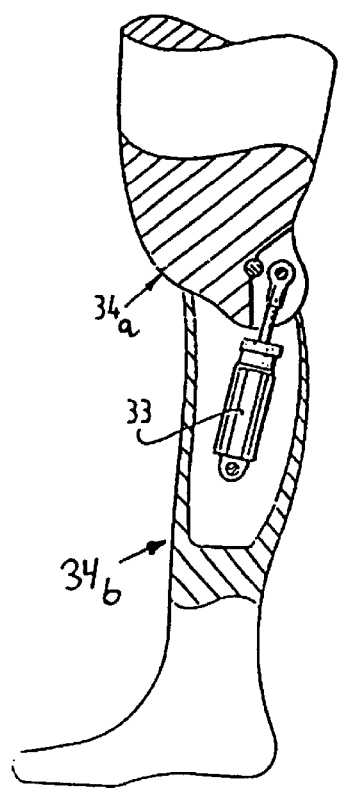
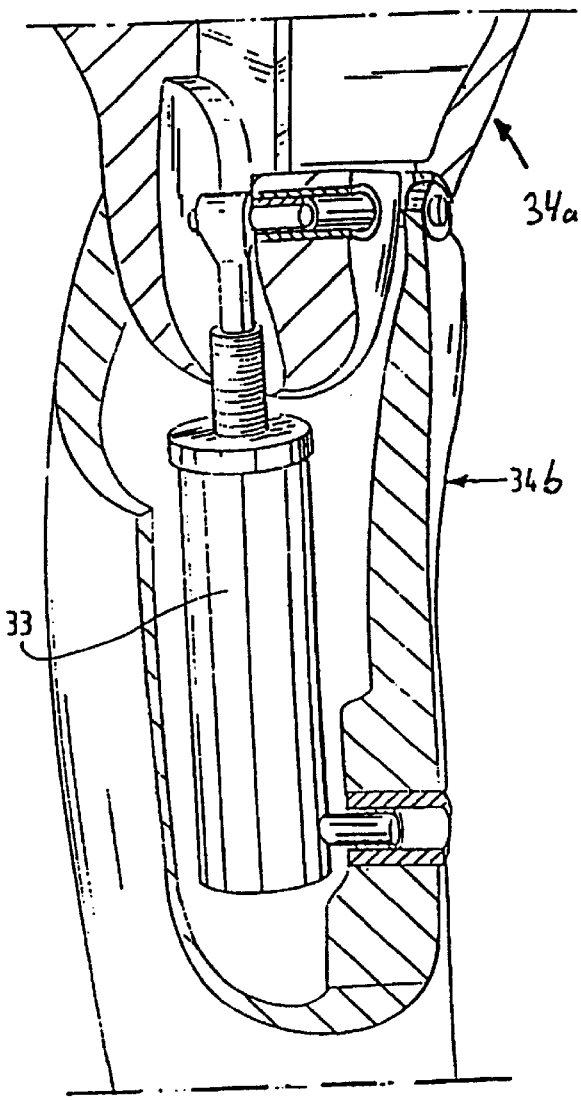
FIG. 6
FIG. 7

SLIDING CONNECTION

BACKGROUND OF THE INVENTION

The invention relates to a linear sliding connection between two components which can be displaced back and forth relative to one another, having a damping device effective in at least one of the two axial displacement directions.

In such a sliding connection, the resistance occurring in a first displacement direction is independent of the resistance which appears during a displacement in the opposite direction.

Previously known damping devices include elements such as a spring or a gas-filled chamber, for example. In other configurations, a cylinder filled with fluid is provided through which a piston equipped with a recess can be displaced (or vice versa).

SUMMARY OF THE INVENTION

The invention is based on the object of designing a linear sliding connection with a damping device having the advantages of the previously known configurations, the intention being to create a larger field of application for such sliding connections.

In association with the features quoted at the beginning, this object is achieved in accordance with the invention by a mechanical friction damping device, which has a wire basket acting as a friction and/or clamping element, which wire basket concentrically surrounds the first of the two displaceable components over a longitudinal section so that it is in contact with its outer surface, having one of its axial ends (first basket end) fixed to the second component and having its other axial end (second basket end) supported so that it can be axially and longitudinally displaced on this second component, and is acted upon in the axial direction by an elastic clamping element at this second basket end in such a way that the wire basket has its axial length extended somewhat with simultaneous substantially radial contact pressure against the outer surface of the first component surrounded by it.

In this solution, the damping arises from the clamping force with which the wire basket acts on the component surrounded by it. If the ends of the wire basket are pulled apart, there is a reduction in the basket diameter and, therefore, an increased action on the enclosed component. This axial lengthening of the basket occurs during a relative displacement between the two components. The clamping force produced by this is only released again when a relative displacement takes place between the two components in the opposite direction with the application of a force which exceeds the force of the elastic clamping element.

The maximum clamping force of the wire basket depends, inter alia, on the length and the diameter of the wire basket, the friction coefficient between the wire basket and the enclosed component and the winding angle with which the wire material has been wound in order to form the wire basket.

The solution in accordance with the invention permits a sliding connection which builds up a large displacement resistance, i.e. a high level of damping, in a first displacement direction between two components but practically no damping in the opposite displacement direction. The difference in the damping force for opposite displacement directions can, without difficulty, be in the order of value of a factor of 100.

A further feature of the sliding connection in accordance with the invention is located in the fact that the displacement resistance is independent of the displacement speed. It is, in addition, advantageous that the sliding connection operates practically without wear. In addition, the desired damping characteristic can be modified in a simple manner by modifying the previously quoted parameters, which determine the maximum clamping force, and by modifying the force of the elastic clamping element.

It is expedient for the section, which is surrounded by the wire basket and is displaceably guided longitudinally in the latter, of the first component to have a circular cross section. This second component can then consist essentially of standardized bar or tube material. The wire basket preferably consists of a wire fabric, by which means a high clamping force can be realized with a wire basket which has a relatively short configuration. The manufacture of wire fabrics is relatively simple.

A simple structure is then ensured if the second component has a cylindrical casing which concentrically surrounds the wire basket. The cylindrical casing then accommodates the entire sliding connection and seals the latter off from the surrounding structure. A simple construction is also ensured when the elastic clamping element has at least one compression spring which concentrically surrounds the wire basket and is supported at one of its ends on the basket end which is supported so that it can be longitudinally displaced axially.

In this arrangement, it is advantageous for a guide element parallel to the axis to be provided for the first component in radial arrangement between the first basket end and the section, which is guided so as to be longitudinally displaceable, of the first component. This provides a particularly stable configuration; the clamping between the components is particularly rigid so that the guide element quoted can also accept fairly large forces which are not applied in the axial direction.

In order to modify the damping characteristic, two compression springs can be provided between the second basket end and the first component. A force/displacement damping characteristic depending on the particular length of the sliding connection can also be achieved by this means.

The sliding connection in accordance with the invention can be advantageously employed as a damping device in a prosthesis or orthesis, where reliability and adjustability of the force/displacement damping characteristic is quite particularly important.

The employment of the sliding connection in accordance with the invention is also advantageous as a damping device in a fitness unit for muscle training. In this case, the sliding connection is used instead of a spring device. In conventional equipment, weights are frequently provided for this purpose which, on the one hand, involve a heavy structure and, on the other hand, normally only permit vertical motions. It is also disadvantageous that potential energy is built up in this arrangement by the raising of the weights and this energy can be abruptly rejected at the end of the exercise. The adjustment of the units operating with weights is, furthermore, time-consuming and labor intensive.

A further modified embodiment in accordance with the invention is characterized by two compression springs, which are arranged one behind the other, whose adjacent spring ends are supported on the second component and whose respective other spring ends are respectively in contact with spring supports which can be displaced axially relative to one another. It is then expedient for the axial displacement of the two spring supports relative to one another to take place manually, for example by actuation of a Bowden cable. In such an embodiment, it is for example expedient for the two components to form a steering column which can be telescopically adjusted longitudinally, one component being provided with a steering wheel and it being possible to fix the other component to a vehicle frame. This configuration can also act as a protective device against the transmission of large forces in the case of an accident or a collision. After a shortening of the steering column, which has taken place because of the action of external force, the original shape can be restored in a simple manner. The clamping force can be reduced or canceled by pressing the two spring supports manually toward one another so that a length adjustment of the steering column is possible to suit the requirement. A torsional restraint between the individual components must also be provided, which is possible by means of a groove/key connection, for example.

Further features of the invention are explained in more detail in association with further advantages of the invention using embodiment examples.

BRIEF DESCRIPTION OF THE DRAWINGS

Some embodiments of the invention, which are used as examples, are shown in the drawing. In the drawings:

FIG. 1 shows, in longitudinal section, a linear sliding connection between two components which can be displaced back and forth relative to one another, having a damping device which opposes, with a relatively high damping force, the pushing together of the two components but, on the other hand, opposes a pulling apart of the two components with only a relatively small resistance;

FIG. 2 shows, in a representation corresponding to FIG. 1, a second component supported so that it can be displaced longitudinally on an elongated first component, a damping device opposing a displacement, of the first component, directed toward the right in FIG. 2 with a relatively high damping force and opposing a displacement to the left with only a relatively small damping force;

FIG. 3 shows, in a representation corresponding to FIG. 1, a further modified embodiment with damping properties corresponding to the embodiment in FIG. 2, the force/displacement characteristic depending, however, on the particular length of the sliding connection;

FIG. 4 shows a further modified embodiment with damping properties corresponding to the embodiment represented in FIG. 1, the force/displacement characteristic again, however, depending on the particular length of the sliding connection;

FIG. 5 shows a further modified embodiment with damping properties corresponding to the solution proposal of FIG. 1, but with a force/displacement characteristic depending on the particular length of the sliding connection;

FIG. 6 shows a vertical section through a leg prosthesis with an incorporated sliding connection in accordance with the invention;

FIG. 7 shows, to an enlarged scale, an excerpt from FIG. 6 in a position somewhat rotated axially relative to FIG. 6;

FIG. 8 shows, in diagrammatic representation, a fitness unit with a sliding connection in accordance with the invention;

DETAILED DESCRIPTION OF PREFERRED EMBODIMENTS

Figure 9:
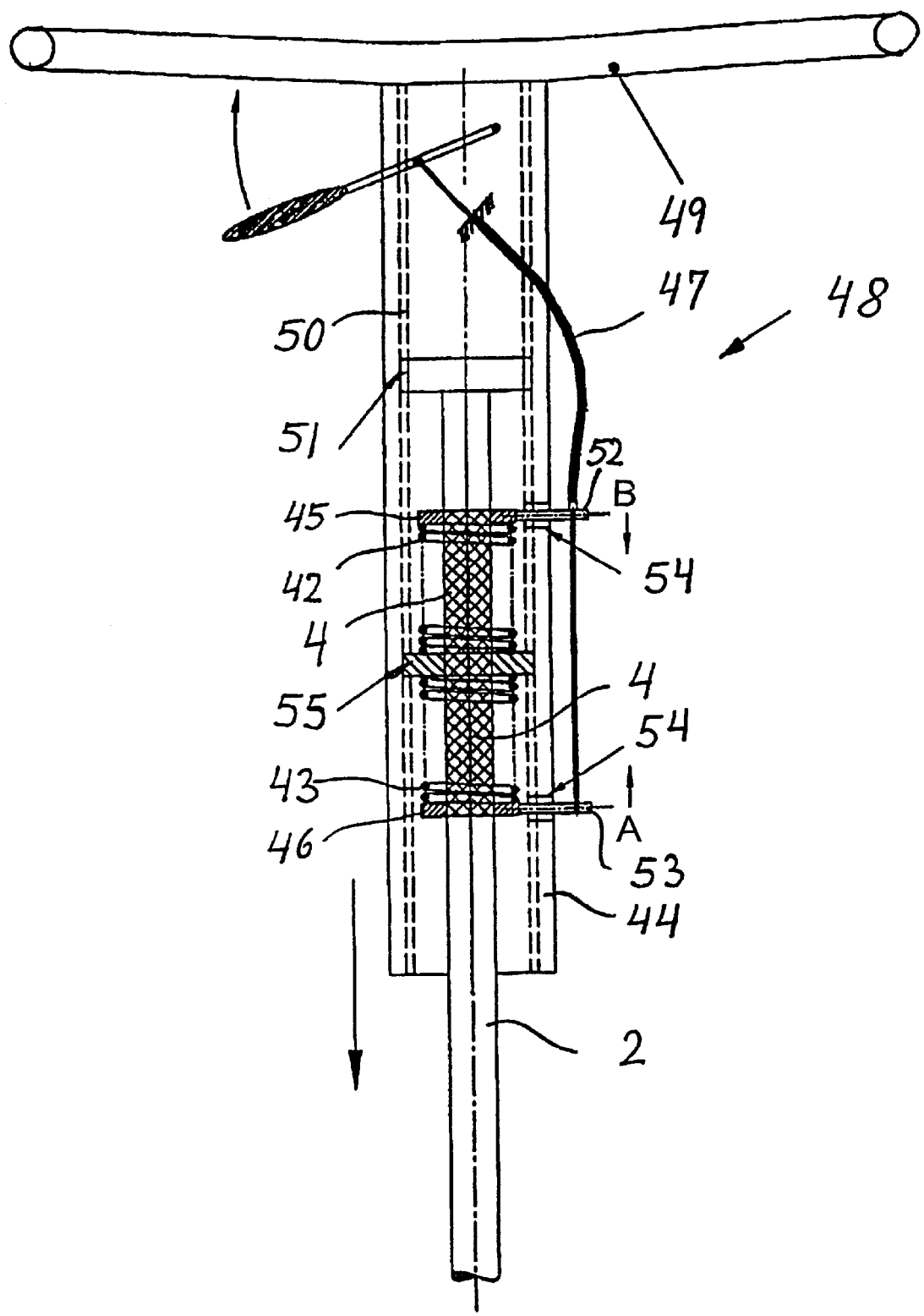
FIG. 9 shows, in diagrammatic representation and in longitudinal section, a steering column, whose length can be adjusted, with a sliding connection in accordance with the invention.

FIG. 1 shows a linear sliding connection 1 between a first component 2, 3 and a second component 9, 10. The first component is composed of a cylindrical rod 2, which merges into a fastening eye 3 at its right-hand end in FIG. 1 and into a cone 5 at its opposite end. The second component consists essentially of a cylindrical casing 9 with a fastening eye 10 provided at its left-hand end (in FIG. 1).

Effective damping is provided in at least one of the two axial displacement directions between the first and second components and is, in fact, provided in the form of a mechanical friction damping device, which has a wire basket 4 acting as a friction and/or clamping element, the wire basket concentrically surrounding the cylindrical rod 2 of the first component over a longitudinal section so that it is in contact with its outer surface. The first basket end 4a, located to the right in FIG. 1, is fixed to the casing 9 of the second component, whereas the opposite second basket end 4b is supported so that it can be axially displaced longitudinally in the cylindrical casing 9. The wire basket 4 consists of a wire fabric 6 and is conically widened at both its ends 4a, 4b toward the basket end in each case and is here fixed by an inner conical clamping ring 8 in each case. In this arrangement, the fixing of the first basket end 4a takes place in an outer conical ring 7 screwed into the right-hand end of the casing 9, whereas the second basket end 4b is fixed in a sliding sleeve 11, whose inner periphery has a conical configuration to match the second basket end 4b and whose cylindrical outer surface is guided so that it can be displaced longitudinally in a support ring 12, which is locationally fixed on the inner wall of the cylindrical casing 9 and forms a torsional restraint for the sliding sleeve 11.

The cylindrical section of the wire basket 4 is surrounded by a compression spring 13 which is supported, at its end on the right in FIG. 1, on the outer conical ring 7 and, therefore, on the first component and which acts, with its end located to the left in FIG. 1, in the axial direction on the sliding sleeve 11 in such a way that the wire basket 4 is somewhat extended in its axial length with simultaneous substantially radial contact pressure on the outer surface of the cylindrical rod 2 surrounded by it.

The inner conical clamping ring 8 forms a guide element, parallel to the axis, for the cylindrical rod 2. In general, the rod 2 is guided so that it can be displaced longitudinally in the wire basket 4.

If the two fastening eyes 3, 10 are pushed toward one another, and if therefore the length of the sliding connection 1 represented in FIG. 1 is shortened, the wire basket 4 exerts on the rod 2 a damping force which acts against the insertion of the first component 2, 3 into the second component 9, 10. If the two components are pulled apart again, the clamping force exerted by the wire basket 4 on the rod 2 only acts while the force pulling the two components apart is larger than the spring force of the compression spring 13 pressing the outer conical ring 7 and the sliding sleeve 11 apart. When this force is exceeded, the sliding sleeve 11 then moves somewhat in the axial direction toward the outer conical ring 7 so that the clamping force acting against the pulling apart of the two components decreases. It is therefore easier to pull the two components apart than it is to press the two components together.

FIG. 2 shows a sliding connection 14 in which the first component has a cylindrical rod 38 which extends through the second component 39, 40 and on which the second component is supported so that it can be displaced back and forth. The support arrangement is, however, transposed relative to the embodiment of FIG. 1: the fixed support is now located at the end of the second component located to the left in FIG. 2 and the displaceable support is located at the right-hand end of the second component. The fixed support for the wire basket 4 again has an outer conical ring 15 firmly connected to the cylindrical casing 40 of the second component, whereas the displaceable support for the second basket end 4b again comprises a sliding sleeve 16 which is guided so that it can be axially displaced in a support ring 17 locationally fixed on the casing 40.

The conical ring 15 forming the fixed support for the first basket end 4a is now located close to flange holes 39 of a fastening flange on the casing 40 which forms the second component. The damping of the sliding connection in FIG. 2 acts in the opposite direction to that of FIG. 1. The pulling apart of the two components (or a displacement to the left of the second component relative to the first component or a displacement to the right of the first component relative to the second component) is subject to a high level of damping, whereas a shortening of the distance between the fastening eye 3 of the first component and the flange holes 39 of the second component by means of a force, which exceeds the clamping force of the compression spring 13, is subject to correspondingly less damping.

Because the cylindrical rod 38 can, in principle, be configured to be endless, the sliding connection of FIG. 2 can be applied, on existing installations, to appropriately directed rods.

FIG. 3 shows a sliding connection 18 which, with respect to the configuration of the second component, corresponds approximately to FIG. 1 and, with respect to the damping effect, i.e. the arrangement of the fixed support and the displaceable support for the two basket ends, to that of FIG. 2. The first component 2, 3 also corresponds essentially to that of FIG. 1 but the cylindrical rod 2 is provided with a ring 19 which forms, on the one hand, a sliding guide within the cylindrical casing of the second component and, on the other hand, a thrust support for a second compression spring 20 whose axially opposite end is in contact with the sliding sleeve 16 of the displaceable support. The sliding sleeve 16 is therefore not only acted on by the compression spring 13 but, in addition, also by the compression spring 20, so that the damping force for the sliding connection 18 can be made dependent on position. This means that the particular distance between the fastening eyes 3, 10 determines the force exerted by the compression spring 20 on the sliding sleeve 16. The force resulting from the two compression springs 13, 20 therefore depends on the particular distance between the fastening eyes 3, 10.

FIG. 4 shows a sliding connection 21 with position-dependent damping which is relatively high when the fastening eyes 3, 10 are moved towards one another and is relatively low when the two fastening eyes 3, 10 are moved away from one another. The first basket end 4a is fixed to a conical ring 23 which is part of an inner cylinder 24, whose end located to the left in FIG. 4 is, in turn, screwed into a cylindrical casing 25 forming the second component and is therefore firmly connected to the casing 25. The second basket end 4b is fixed in a support ring 22, which is guided by protrusions 26 in slot guides of the inner cylinder 24 so that the support ring 22 can be displaced axially.

A ring 28 is fixed to the cylindrical rod 2, one end of a compression spring 41, whose other end is in contact with the protrusions 26 and the support ring 22, being supported on the ring 28. In consequence, the spring force acting on the rod 2 depends on the particular distance between the fastening eyes 3, 10.

An additional compression spring can be positioned, for example, between the axially displaceable sliding sleeve 22 and the locationally fixed conical ring 23 in order to modify the damping characteristic of the sliding connection 21.

FIG. 5 shows a sliding connection 29, which can be regarded as a variant of the sliding connection 18 of FIG. 3, just as the sliding connection 1 of FIG. 1 represents a variant of the sliding connection 14 of FIG. 2. An axially displaceable sliding sleeve 13 is again provided which is connected to the second basket end 4b and forms one thrust support of a compression spring 31, whose other axial end is supported on an annular disk 32 of the cylindrical rod 2. This additional compression spring again provides a position-dependent damping characteristic, which is relatively large when the two fastening eyes 3, 10 are moved toward one another and is relatively small when these two fastening eyes 3, 10 are moved away from one another.

FIGS. 6 and 7 show a sliding connection 33, which forms a damping device and which is provided between a thigh prosthesis 34a and a lower leg prosthesis 34b.

FIG. 8 shows a fitness unit 35 which is provided with two hand grips 36, 37, which can be pressed together and pulled apart by means of a sliding connection in accordance with the invention. A sliding connection 14 in accordance with FIG. 2 can be provided, the fastening eye 3 being then replaced by the hand grip 37 and the fastening flange with the flange holes 39 being replaced by the hand grip 36. The largest resistance force then occurs when the two hand grips are pulled apart, whereas the damping can be very small when the fitness unit is pushed together.

FIG. 9 shows a telescopically divided steering column 48, which is composed of a cylindrical rod 2 which forms a first component and which is guided so that it can be displaced longitudinally in a cylindrical casing or tube which forms a second component 44. At its upper end, the second component 44 is equipped with a steering wheel 49 and it has, in its inner cylindrical surface, axially extending grooves 50 in which the first component 2 is guided so that it can be displaced longitudinally but is torsionally restrained by means of sliding pieces 51.

A wire basket 4 is pushed onto the rod 2 and its two axially opposite ends are connected to a respective annular disk forming a spring support 45, 46, these annular disks protruding in the radial direction to the outside through an axial slot 54 in the tube wall of the second component 44 by means of handles 52, 53. The axial length of the axial slot 54 determines the maximum possible axial displacement of the spring supports 45, 46 on the rod 2.

The wire cage 4 is coaxially surrounded by two compression springs 42, 43, which are arranged axially one behind the other and each of whose outer ends is supported on the spring support 45 or 46 and whose inner ends are supported on a central thrust support 55. The two compression springs 42, 43 keep the wire basket 4 axially extended and, by this means, firmly clamp the rod 2 in its relationship with the second component 44. This clamping effect is effective in the case of axial directions. In the event of an accident, an introduction of force, via the steering wheel 49 to the second component 44 in the direction of the arrow shown or, indeed, in the case of an oppositely directed introduction of force via the rod 2 forming the first component, overcomes the clamping force applied by the wire basket 4; a relative axial displacement between the two components 2, 44 takes place.

Two wire baskets 4 can also be provided instead of only one wire basket 4.

So that an axial steering wheel adjustment can be undertaken, a Bowden cable 47 is provided which acts on both handles 52, 53 which, on actuation of the Bowden cable in the direction of the arrow shown, are pulled somewhat together in the axial direction from their positions A, B against the action of the two compression springs 42, 43. This effects an axial shortening of the wire basket or wire baskets 4 and, therefore, a cancelation of the clamping force exerted by them so that the steering wheel 49, together with the second component 44, can be displaced in the desired axial direction relative to the rod 2. The desired position is then fixed by releasing the Bowden cable.

Figure 10:
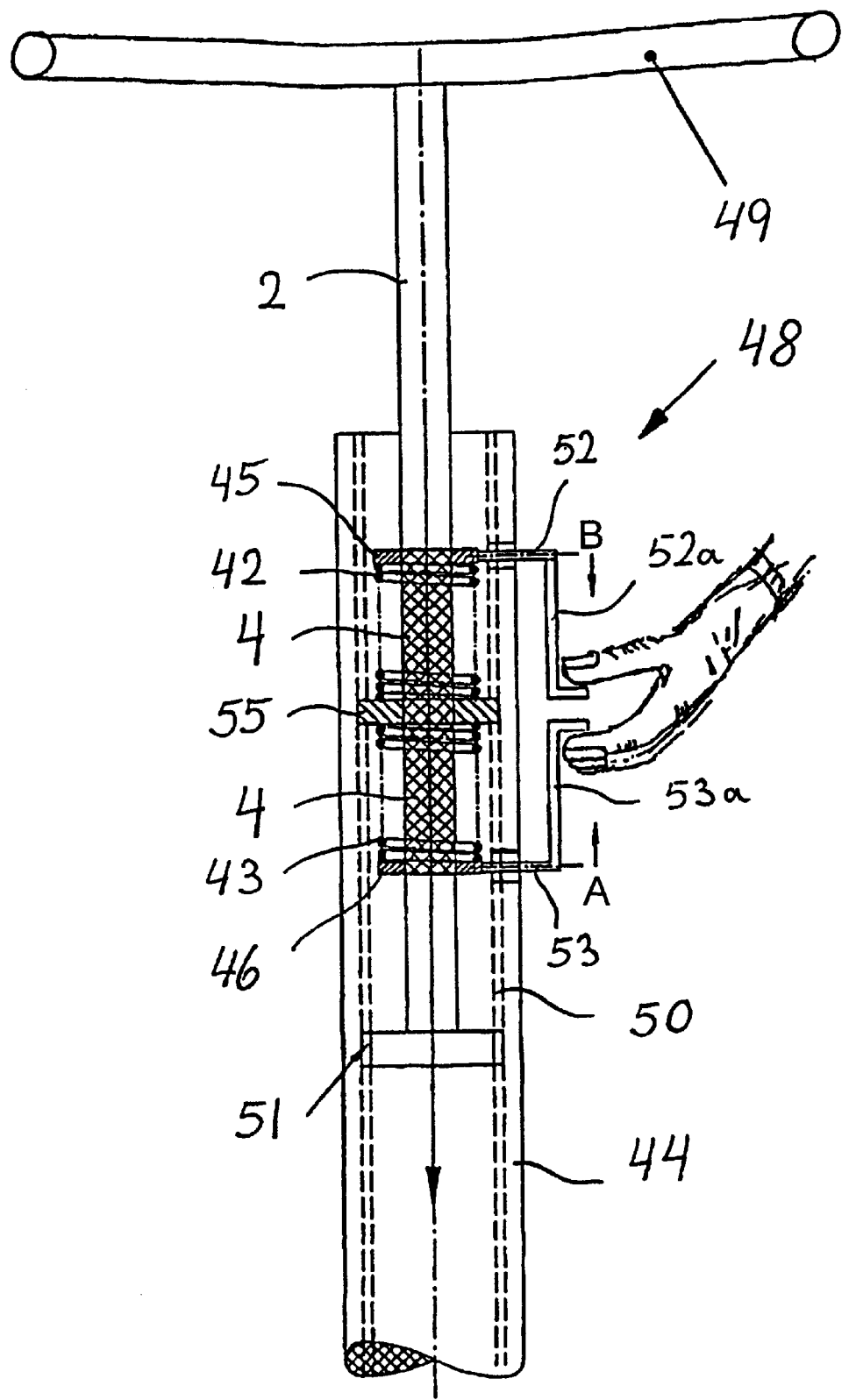
FIG. 10 shows the steering column in accordance with FIG. 9 in a somewhat modified embodiment.

The embodiment of FIG. 10 differs from that of FIG. 9 mainly in that the steering wheel 49 is now connected to the rod 2 while the second component 44 forms the actual steering column, which is fixed in the vehicle. In addition, a tongs-type configuration of the two handles 52, 53 is provided between the two components 2, 44, instead of the Bowden cable shown in FIG. 9, for the manual cancelation of the clamping connection. The clamping connection is canceled by pressing together two projections 52a, 53a and is restored by releasing the two projections, under the action of the two compression springs 42, 43.

What is claimed is:

1. A linear sliding connector, comprising:
   a first component and a second component linearly displaceable in a first and second axial direction relative to one another; and
   a mechanical friction damping device for effecting damping in at least one of said first and second axial displacement directions, said damping device comprising:
   a wire basket acting as a friction element, said wire basket surrounding and contacting an outer surface of a longitudinal section of said first displaceable component, wherein a first axial end of said wire basket is fixed to said second displaceable component, and wherein a second axial end of said wire basket is supported by and is axially and longitudinally displaceable on said second component, and an elastic element exerting a force in the axial direction on said second axial end of said wire basket sufficient to extend the axial length of said wire basket and to produce a predetermined substantially radial contact pressure against the outer surface of said first displaceable component surrounded by the wire basket.

2. A linear sliding connection of claim 1, wherein the cross section of said longitudinal section of said first displaceable component, surrounded and contacted by said wire basket, is circular.

3. A linear sliding connection of claim 2, wherein said second displaceable component comprises a cylindrical casing concentrically surrounding said wire basket.

4. A linear sliding connection of claim 1, wherein said elastic element comprises at least a first compression spring concentrically surrounding said wire basket, said compression spring being supported at a first end on the second axial end of said wire basket to permit longitudinal and axial displacement.

5. A linear sliding connection of claim 4, wherein said second displaceable component supports a second end of said first compression spring.

6. A linear sliding connection of claim 4, wherein said first displaceable component supports said second end of said first compression spring.

7. A linear sliding connection of claim 4, further comprising a second compression spring, supported at one end on said second axial end of said wire basket and at a second end on said first displaceable component such that said spring is axially displaceable in a longitudinal direction.

8. A linear sliding connection of claim 1, wherein said elastic element is adjustable.

9. A linear sliding connection of claim 1, wherein said wire basket comprises a wire fabric.

10. A linear sliding connection of claim 1, wherein each of said first axial end of said wire basket and said second axial end of said wire basket is conically widened toward said ends of said wire basket, and further comprising an inner conical clamping ring fixing each end of said wire basket.

11. A linear sliding connection of claim 1, further comprising a sliding sleeve and a support ring connected to said second displaceable component, and wherein said second axial end of said wire basket is fixed in the sliding sleeve, such that said second basket end is longitudinally displaceable in the support ring.

12. A linear sliding connection of claim 11, wherein said support ring forms a torsional restraint for said sliding sleeve.

13. A linear sliding connection of claim 1, further comprising, for said first displaceable component, a guide element parallel to said longitudinal axis, said guide element being radially arranged between said first wire basket end and said first displaceable component such that said first displaceable component is longitudinally displaceable.

14. A linear sliding connection of claim 1, wherein said elastic element comprises two compression springs arranged one behind the other, wherein adjacent ends of said springs are supported on said second displaceable component, and further comprising two spring supports, wherein non-adjacent ends of said springs contact said spring supports, said spring supports being axially displaceable relative to one another.

15. A linear sliding connection of claim 14, further comprising a Bowden cable for axial displacement of said spring supports.

16. A telescopically, longitudinally adjustable steering column, comprising a linear sliding connection of claim 14, a steering wheel attached to one end of said two displaceable components and a second end of said two displaceable components comprises a bracket for fixing to a vehicle frame.

17. A prosthesis or orthesis, comprising a first prosthesis/orthesis member and a second prosthesis member connected together by a linear sliding connection of claim 1.

18. A fitness unit, comprising a first force member and a second force member connected together by a linear sliding connection of claim 1.

* * * * *